(12) United States Patent
Kim

(10) Patent No.: US 10,535,914 B2
(45) Date of Patent: Jan. 14, 2020

(54) ANTENNA DEVICE

(71) Applicant: LG INNOTEK CO., LTD., Seoul (KR)

(72) Inventor: Dong Woo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 70 days.

(21) Appl. No.: 15/579,264

(22) PCT Filed: Jun. 8, 2016

(86) PCT No.: PCT/KR2016/006045
§ 371 (c)(1),
(2) Date: Dec. 4, 2017

(87) PCT Pub. No.: WO2016/200133
PCT Pub. Date: Dec. 15, 2016

(65) Prior Publication Data
US 2018/0159204 A1    Jun. 7, 2018

(30) Foreign Application Priority Data
Jun. 8, 2015 (KR) .................... 10-2015-0080573

(51) Int. Cl.
*H01Q 1/32* (2006.01)
*H01Q 1/22* (2006.01)
(Continued)

(52) U.S. Cl.
CPC ......... *H01Q 1/2291* (2013.01); *H01Q 1/3275* (2013.01); *H01Q 3/26* (2013.01);
(Continued)

(58) Field of Classification Search
CPC .... H01Q 1/22–243; H01Q 1/32; H01Q 1/325; H01Q 1/3275; H01Q 3/26;
(Continued)

(56) References Cited

U.S. PATENT DOCUMENTS 7,904,219 B1 * 3/2011 Lowrey ................. G01C 21/26
701/32.3
7,920,102 B2 * 4/2011 Breed ..................... B60K 35/00
340/991

(Continued)

OTHER PUBLICATIONS

Search Report, dated Aug. 24, 2016, for International Application No. PCT/KR2016/006045.

(Continued)

*Primary Examiner* — Daniel Munoz
*Assistant Examiner* — Patrick R Holecek
(74) *Attorney, Agent, or Firm* — LRK Patent Law Firm

(57) ABSTRACT

An antenna device includes: a substrate; a wave antenna, disposed on one surface of the substrate, for transmitting and receiving data to and from an external vehicle or a base station; a GPS antenna disposed on one surface of the substrate; a WiFi antenna, disposed on the other surface of the substrate, for transmitting, to a head unit, data that the wave antenna has received, and transmitting, to the wave antenna, data that has been received from the head unit; and a system module for receiving a signal from at least any one of the wave antenna, the GPS antenna or the WiFi antenna and controlling the same.

15 Claims, 5 Drawing Sheets

(51) Int. Cl.
*H01Q 3/26* (2006.01)
*H04B 1/00* (2006.01)
*H04B 1/3822* (2015.01)
*H04B 7/08* (2006.01)
*H04B 1/06* (2006.01)

(52) U.S. Cl.
CPC ......... *H04B 1/0064* (2013.01); *H04B 1/3822* (2013.01); *H04B 7/0802* (2013.01); *H04B 1/06* (2013.01)

(58) Field of Classification Search
CPC ........ H01Q 21/28; H04B 1/0064; H04B 1/06; H04B 1/3822; H04B 7/0802
See application file for complete search history.

(56) References Cited

U.S. PATENT DOCUMENTS

| | | | | |
|---|---|---|---|---|
| 9,462,626 | B1* | 10/2016 | Thanayankizil | H04B 1/3822 |
| 9,966,659 | B2* | 5/2018 | Chakam | H01Q 1/1214 |
| 2012/0274519 | A1* | 11/2012 | Chakam | H01Q 1/3275 343/702 |
| 2013/0301584 | A1* | 11/2013 | Addepalli | H04W 4/046 370/329 |
| 2014/0357311 | A1* | 12/2014 | Suzuki | H04W 52/04 455/522 |

OTHER PUBLICATIONS

Written Opinion, dated Aug. 24, 2016, for International Application No. PCT/KR2016/006045.

* cited by examiner

ANTENNA DEVICE

CROSS-REFERENCE TO RELATED APPLICATIONS

The present application is a U.S. National Phase entry from International Application No. PCT/KR2016/006045, filed Jun. 8, 2016, which claims priority to Korean Patent Application No. 10-2015-0080573, filed Jun. 8, 2015, the disclosure of which is incorporated by reference herein in its entirety.

BACKGROUND

1. Technical Field

The present invention relates to an antenna device, and more specifically, to an antenna device which modularizes a Wi-Fi antenna, a WAVE antenna and a GPS antenna as a device.

2. Description of Related Art

Vehicle-to-everything (V2X) refers to a technique of exchanging or sharing information such as traffic situation or the like while driving by means of communication between a vehicle and a road infrastructure, a vehicle and a vehicle, a vehicle and a mobile device or the like. If a wireless vehicle network based on V2X communication is utilized, safety and efficiency can be maximized. If this technique is used, advancement in automobile and IT industry can be expected, and national competitiveness may be enhanced by minimizing social cost.

Meanwhile, it tends to integrate the parts providing a plurality of functions into a module according to the miniaturization trend of terminals. As the scale of wireless communication market increases, interest in wireless communication methods, such as Wi-Fi communication methods, Bluetooth communication methods, GPS communication methods and the like, grows, and studies on the communication systems supporting a small-scale and multiplex communication mode, which can provide these communication methods in one module, are actively progressed.

However, since such communication systems are manufactured to be applicable to a terminal such as a mobile terminal or the like, there is a limit in implementing a communication method appropriate to the characteristic of the wireless vehicle network based on V2X communication.

SUMMARY OF THE INVENTION

An object of the present invention is to provide communication between a vehicle and a vehicle, a vehicle and an infrastructure and a vehicle and a mobile device in a form integrating an antenna, V2X and a GPS system.

Another object of the present invention is to configure a WAVE antenna, in order to remove a cable between the WAVE antenna and the system, directly on the opposite surface of a PCB substrate on which the system is formed, and improve a problem of a communication range reducing according to the length of a cable when an RF cable is used between the antenna and the system.

Still another object of the present invention is to use connection wires to a minimum through a wireless communication technique for the sake of internal connection and communication of a V2X system and a vehicle.

Still another object of the present invention is to provide an antenna device which can perform communication with the outside of a vehicle and communications internal to the vehicle, through a V2X system.

To accomplish the above objects, according to one aspect of the present invention, there is provided an antenna device including: a substrate; a WAVE antenna disposed on one surface of the substrate to transmit and receive data to and from an external vehicle or a base station; a GPS antenna disposed on one surface of the substrate; a Wi-Fi antenna disposed on the other surface of the substrate to transmit the data that the WAVE antenna has received to a head unit and transmit data received from the head unit to the WAVE antenna; and a system module for receiving a signal from at least any one of the WAVE antenna, the GPS antenna and the Wi-Fi antenna.

The WAVE antenna may be configured of a plurality of antennas.

Directionalities of the plurality of antennas may be different from each other.

The antenna gain of the WAVE antenna may be 3 to 6 dBi.

The Wi-Fi antenna may be disposed to be included in the system module.

The system module may include: a signal processing unit electrically connected to the WAVE antenna to transmit a signal to the WAVE antenna and receive a signal from the WAVE antenna; a Wi-Fi unit electrically connected to the Wi-Fi antenna to transmit and receive signals to and from the Wi-Fi antenna; a GPS unit electrically connected to the GPS antenna to transmit and receive GPS signals; a control unit for controlling operation of the system module; and a power supply unit electrically connected to a power supply unit of the vehicle to supply power to the system module.

The system module may further include a memory unit for storing the signals transmitted and received by the signal processing unit or the GPS unit.

The system module may further include a Hardware Security Module (HSM) unit.

The control unit may transmit and receive signals to and from the external vehicle using Ethernet or transmit and receive signals to and from other microcontrollers in the vehicle using CAN communication.

The power supply unit may receive 6 to 19V of battery input power of the vehicle, transform the input power into 5V, which is a voltage appropriate to the system module, and supply the transformed voltage.

The system module is electrically and directly connected to at least one of the WAVE antenna and the GPS antenna through the substrate.

The Wi-Fi unit may authenticate a connected device by pairing a signal transmitted or received by the Wi-Fi antenna with the control unit.

The control unit may display the signals transmitted and received by the Wi-Fi antenna on a display unit connected to the system module using a mirror link method.

The control unit may transmit the signals transmitted and received by the WAVE antenna or the Wi-Fi antenna to a head-up display (HUD) to be displayed on the HUD.

Advantageous Effects

The present invention has an effect of providing communication between a vehicle and a vehicle, a vehicle and an infrastructure and a vehicle and a mobile device in a form integrating an antenna, V2X and a GPS system.

The present invention has an effect of configuring a WAVE antenna, in order to remove a cable between the WAVE antenna and the system, directly on the opposite surface of a PCB substrate on which the system is formed, and improving a problem of a communication range reducing according to the length of a cable when an RF cable is used between the antenna and the system.

The present invention has an effect of using connection wires to a minimum through a wireless communication technique for the sake of internal connection and communication of a V2X system and a vehicle.

The present invention has an effect of performing communication with the outside of a vehicle and communications internal to the vehicle, through a V2X system.

The present invention has an effect of enhancing bi-directionality by configuring the WAVE antenna in plurality and designing the antennas to have orientations of opposite directions.

DETAILED DESCRIPTION OF THE INVENTION

Figure 1:
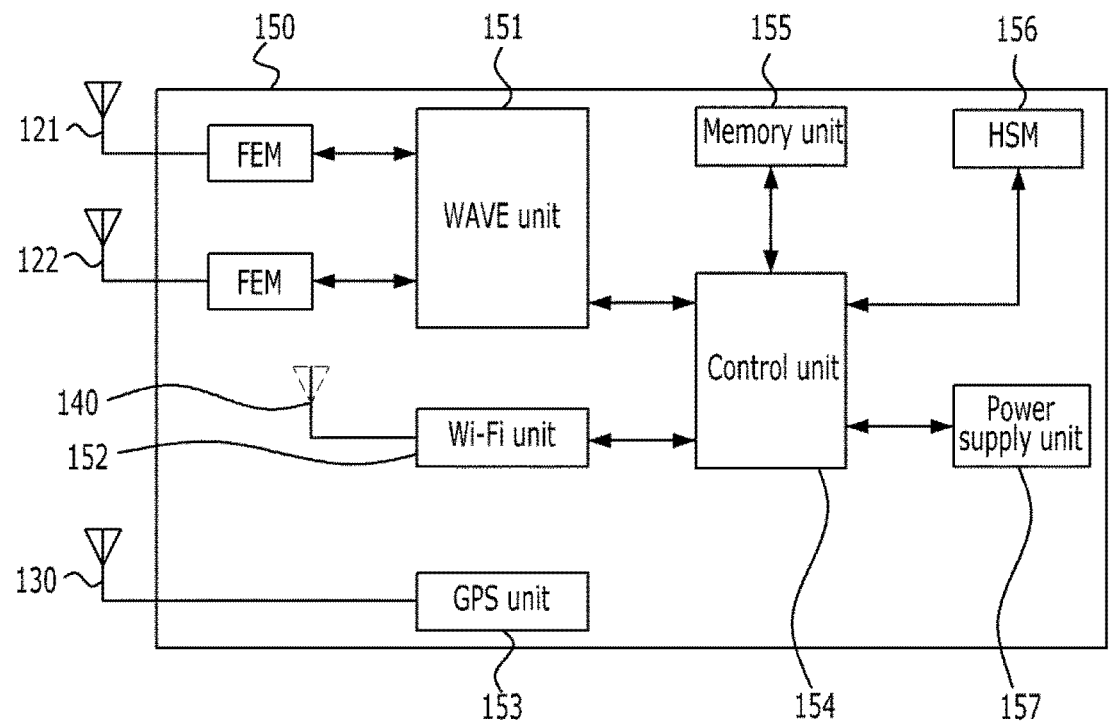
FIG. 1 is a block diagram schematically showing an antenna device according to an embodiment of the present invention.

Hereafter, an antenna device of the present invention will be described in detail with reference to the accompanying drawings. The described embodiments are provided to enable those skilled in the art to easily understand the spirit of the present invention, and the present invention is not limited thereto. In addition, the elements expressed in the accompanying drawings are schematized drawings to easily explain the embodiments of the present invention and may be different from actually implemented forms.

In the drawings, since the thickness or size of a layer (film), region, pattern or structure may be modified for the clarity and convenience of explanation, it does not completely reflect a real size. Meanwhile, the expression of 'including' certain components is an expression of an 'open type' which merely refers to existence of corresponding components, and it should not be construed as precluding additional components.

Figure 2:
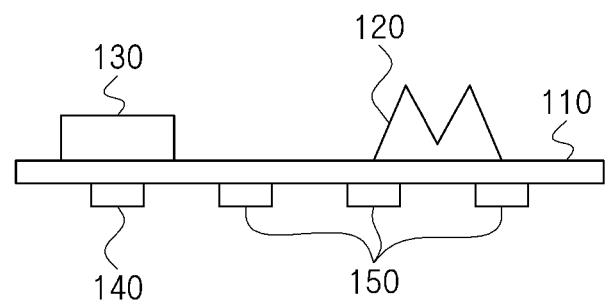
FIG. 2 is a front view schematically showing an antenna device according to an embodiment of the present invention.
Figure 3:
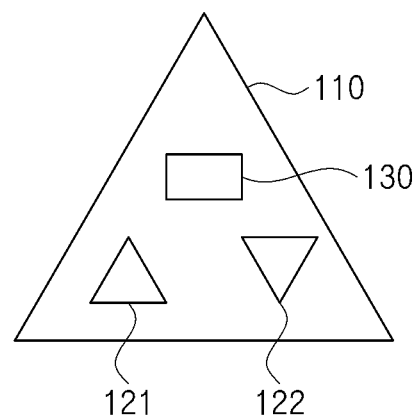
FIG. 3 is a plan view schematically showing an antenna device according to an embodiment of the present invention.
Figure 4:
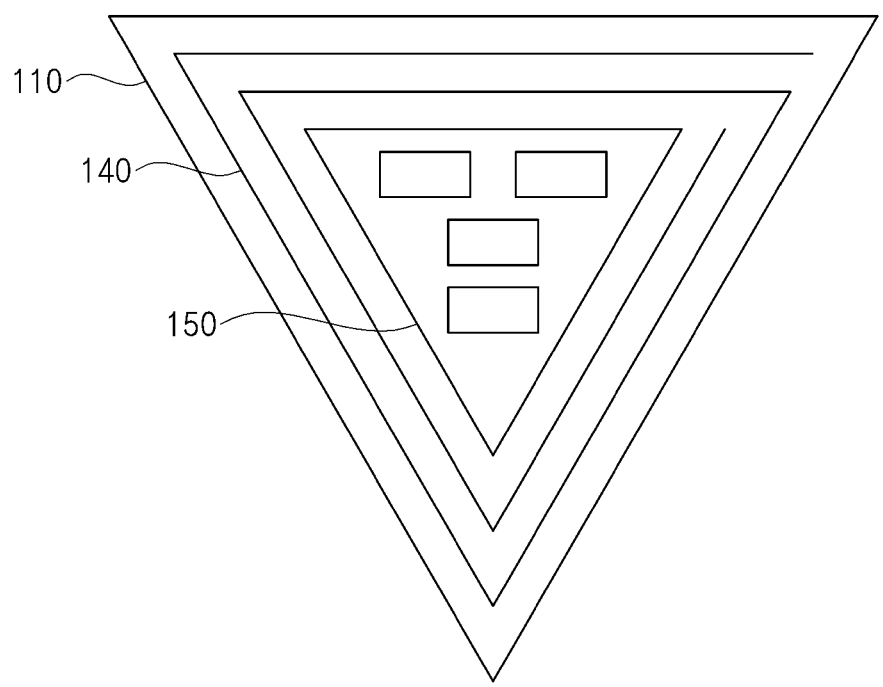
FIG. 4 is a bottom view schematically showing an antenna device according to an embodiment of the present invention.

FIG. 1 is a block diagram schematically showing an antenna device according to an embodiment of the present invention, FIG. 2 is a front view schematically showing an antenna device according to an embodiment of the present invention, FIG. 3 is a plan view schematically showing an antenna device according to an embodiment of the present invention, and FIG. 4 is a bottom view schematically showing an antenna device according to an embodiment of the present invention. Referring to FIGS. 1 to 4, an antenna device according to an embodiment of the present invention includes a substrate 110, a WAVE (wireless access in vehicle environment) antenna 120 disposed on one surface of the substrate 110, a GPS antenna 130 disposed on one surface of the substrate 110, a Wi-Fi antenna 140 disposed on the other surface of the substrate 110 to transmit and receive data to and from an external vehicle or a base station, and a system module 150 for receiving a signal from at least any one of the WAVE antenna 120, the GPS antenna 130 and the Wi-Fi antenna 140.

The antenna device is a device which can implement communication between a vehicle and the inside of the vehicle, as well as communication between a vehicle and the outside of the vehicle, in one module. The antennas included in the antenna device of the present invention may be total three types, including the WAVE antenna 120, the GPS antenna 130 and the Wi-Fi antenna 140.

The WAVE antenna 120 included in the antenna device of the present invention may transmit and receive RF signals of 5.9 GHz band. The WAVE antenna 120 may receive RF signals from an external vehicle or an external base station. Although the WAVE antenna 120 may be designed as one antenna, the WAVE antenna 120 may be designed as a plurality of antennas to support a diversity function to receive a good signal using two or more antennas.

When the WAVE antenna 120 is designed as a plurality of antennas, directionalities of the antennas may be designed to be different from each other. If the WAVE antenna 120 is designed as a dual antenna, directionalities of the dual antenna may be designed to be opposite to each other. A maximum transmission and reception distance is important for the V2X device. Communications should be continuously connected without disconnection of signals even when the vehicle runs at a high speed. If it is designed to orient an antenna to a specific direction, there is a problem of decreasing the communication distance to the vehicles on the rear side. Accordingly, it is preferable to maximally secure isolation between two antennas and design the oriented directions to be opposite to each other.

The antenna gain of the WAVE antenna 120 is preferably designed to be 3 to 6 dBi to secure directionality. The Effective Isotropic Radiated Power (EIRP) is preferably designed not to exceed +23 dBm. However, when the maximum transmission level is +20 dBm in the system module 150, the antenna gain is preferably designed to be 3 dBi or less.

The specification of wireless LAN of the WAVE antenna 120 is preferably 802.11p. IEEE 802.11p is a specification for Wireless Access in Vehicular Environment (WAVE), which is a wireless access in a vehicular mobile environment. IEEE 802.11p is designed to support Intelligent Transportation System (ITS) applications and supports the 5.9 GHz band (5.85 GHz to 5.92 GHz). IEEE 802.11p is used for communication networks of vehicles, automatic billing, vehicle safety services, and transfer of information between vehicles.

The GPS antenna 130 is a device for receiving current position of a vehicle and may include a sensor for accuracy of position information.

The Wi-Fi antenna 140 is disposed on the other surface of the substrate 110, and the Wi-Fi antenna 140 is preferably disposed to be included in the system module 150. The Wi-Fi antenna 140 is configured since a separate channel for signals other than RF signals or GPS signals may be needed. Wi-Fi is a technique referring to a short distance communication network capable of accessing wireless Internet within a predetermined distance using a radio wave or infrared communication method at a place where a wireless access device is installed.

The Wi-Fi antenna 140 may be implemented including a Bluetooth antenna or be implemented with the Bluetooth antenna only. The Bluetooth is a wireless technique standard for connecting portable devices such as a cellular phone, a notebook computer, an earphone, a headphone and the like to each other and exchanging information among them. The Bluetooth antenna is disposed for Bluetooth communications.

The Wi-Fi antenna 140 transmits and receives signals of 2.4 GHz band and 5 GHz band. The Wi-Fi antenna 140 is disposed to connect data transmitted and received through the WAVE antenna 120 to a head unit. The head unit refers to a car audio core unit operating and controlling the entire car audio system. It refers to a deck which is buried in the dashboard of a vehicle and controls the functions of a cassette player, a CD player or a radio. The head unit may play back music using a CD, USB memory or an SD card or connect a smart phone, an MP3 player or the like to an Auxiliary (AUX) port. The head unit is divided into a one-level type and a two-level type depending on the size.

At this point, the wireless data transmission method of the Wi-Fi antenna 140 may be implemented in two types. The Wi-Fi antenna 140 transmits wireless data in a pairing method. Pairing is a method of connecting two parties without an additional work if they know addresses by requesting each other since they recognizes the address of the opponent. The Wi-Fi antenna 140 may be paired with the head unit using Wi-Fi or Bluetooth. A format defined in each specification is preferably used for data transmission, and a data transmission protocol should be defined.

The Wi-Fi antenna 140 may transmit data through a mirror link (mirror cast) method. If the mirror link technique is used, various mobile applications and Internet services may be confirmed and handled through a navigator. It simplifies the internal environment of a vehicle by connecting the data wirelessly.

The V2X system of the present invention may connect the Wi-Fi unit 152 of the V2X system to the Wi-Fi module in the head unit using a mirror link so that state information of V2X may be displayed on the display device of the head unit or transfer control information to the V2X system through the connection by way of the head unit. All devices that can be interconnected with the V2X system, such as the head unit or a personal mobile device, may use the mirror link method. The V2X system may include its own On Screen Display (OSD) in order to use the mirror link method. Or, the V2X system may include an interface protocol for the OSD and may display and control through the head unit using the interface protocol. The OSD is a control function for optimizing the screen of a monitor by a user himself or herself. The functions that can be controlled through the OSD may generally include brightness and contrast of the screen, tuning, RGB control, control of the vertical and horizon size and position of the screen and the like, and the functions are not limited thereto. In addition, a user interface (UI) should be defined for each warning message. The V2X system may transfer data to the head unit or the mobile device to display and control the V2X system.

The system module 150 includes a signal processing unit 151 electrically connected to the WAVE antenna 120 to transmit a signal to the WAVE antenna 120 and receive a signal from the WAVE antenna 120, a Wi-Fi unit 152 electrically connected to the Wi-Fi antenna 140 to transmit and receive signals to and from the Wi-Fi antenna 140, a GPS unit 153 electrically connected to the GPS antenna 130 to transmit and receive GPS signals, a control unit 154 for controlling operation of the system module 150, and a power supply unit 157 electrically connected to the power supply unit of the vehicle to supply power to the system module 150.

The signal processing unit 151 transmits and receives WAVE signals of 5.9 GHz band to and from the WAVE antenna 120. The signal processing unit 151 may be connected to the WAVE antennas 121 and 122 with the intervention of a Front End Module (FEM). The FEM functions as a filter for separating transmission signals from reception signals so that the signals may not collide with each other and passing only a specific frequency.

The Wi-Fi unit 152 transmits data that the WAVE antenna 120 has received from an external vehicle or a base station to the head unit in the vehicle. The Wi-Fi unit 152 transmits the data that the WAVE antenna 120 has received from an external vehicle or a base station to the head unit in the vehicle through the Wi-Fi antenna 140.

Since the Wi-Fi unit of the present invention is particularly disposed on the other surface of the substrate like the system module, interference with the WAVE antenna formed on one surface of the substrate is reduced, and since signal noises are reduced when the Wi-Fi unit communicates with the head unit in the vehicle, a further speedy and accurate control can be made. A conventional system module is connected to several antennas through cables, and it is disadvantageous in that communication distance is reduced as much as about 30 meters per one meter of cable length. Accordingly, since the system module of the present invention electrically and directly connects the system module to a plurality of antennas through the substrate, communication distance can be sufficiently secured, and communication sensitivity and accuracy can be improved.

At this point, the Wi-Fi unit may authenticate a connected device by pairing a signal transmitted or received by the Wi-Fi antenna with the control unit. Such a pairing method may also be used for Wi-Fi or Bluetooth, and it corresponds to a method of authenticating a connected device by matching the protocols of the connected device and the head unit. At this point, a format defined in each specification is basically used for data transmission, and a message transmission protocol should be defined in advance.

In addition, the Wi-Fi unit may display the signals transmitted and received by the Wi-Fi antenna on the display unit connected to the system module using a mirror link method. At this point, the display unit may be applied to all screen display devices that can be used in a vehicle, and for example, it can be used in all displays that can be applied to a vehicle, such as an embedded navigator, a smart terminal, a head-up display (HUD) and the like.

The mirror link method may be used when the Wi-Fi unit in the V2X system is connected to the Wi-Fi module in the head unit and information on the V2X is displayed on the head unit, and such a mirror link method corresponds to a method of displaying a device connected to the system module on the display unit as is. In addition, the mirror link method may be used in all devices that can be interconnected with the V2X system.

At this point, in order to use the mirror link method, the V2X system should secure an OSD of its own, and a UI should be defined for each warning message. In addition, since the OSD and the UI may have a different design according to a manufacturing company, the present invention may be implemented through a structure of transmitting data from the V2X system (a master) to the head unit or a mobile device (a slave).

Figure 7:
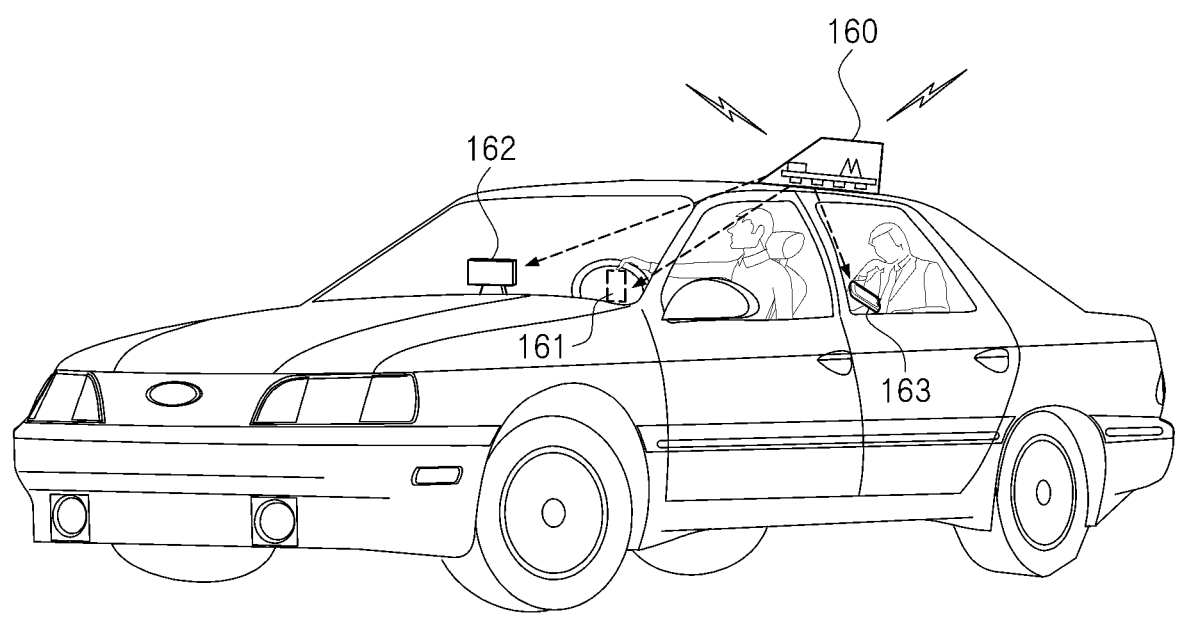
FIGS. 7 and 8 are exemplary views showing a configuration of transmitting and receiving data by an antenna device between terminals in a vehicle according to an embodiment of the present invention.

Referring to FIG. 7, an embodiment used for a display device in a vehicle of the present invention can be confirmed. If a signal is received through a Wi-Fi antenna, a WAVE antenna, a GPS antenna or the like included in the shark antenna 160, the signal may be transmitted to a display that can be used in the vehicle, such as a head-up display 161, a stationary navigator 162, a smart terminal 163 or the like.

Figure 8:
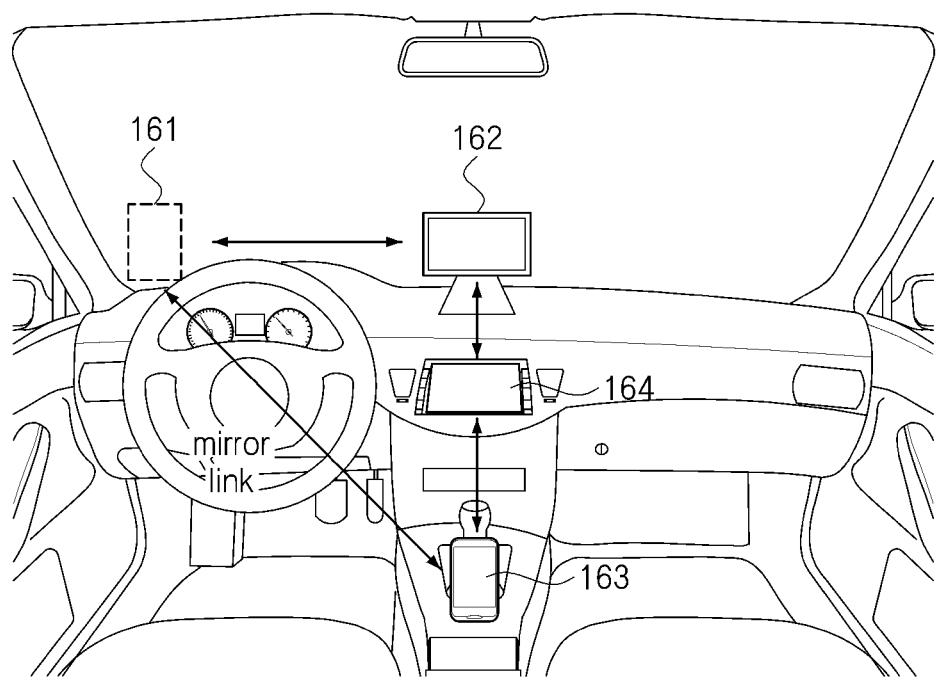

In addition, referring to FIG. 8, the display devices in a vehicle of the present invention may be interconnected with each other using a mirror link method. Information displayed on the head-up display 161 may be displayed on the screen of the stationary navigator 162, the smart terminal 163, the built-in navigator 164 or the like using a mirror link. At this point, since each display device is different in the specification and size, the information may be displayed in a form converted according to a UI and a design appropriate to the display device.

The control unit 154 controls operation of the system module 150. At this point, the control unit may transmit and receive signals to and from the outside of the vehicle using the Ethernet or transmit and receive signals to and from other microcontrollers in the vehicle using CAN communication.

The power supply unit 157 receives input power from the power supply unit of the vehicle and transforms the power into a specific voltage. Generally, the input power received from the power supply unit of a vehicle is 6 to 19V. The input power is transformed into a specific voltage, such as 5V, 3.3V or the like, so as to be appropriately used in the antenna device.

The system module 150 may further include a memory unit 155 for storing the signals transmitted and received by the signal processing unit or the GPS unit. A user may change performance of the system module 150 by arbitrarily changing the type and capacity of the memory unit 155 according to the software structure and the storage space of the system module 150. The system module 150 may further include a Hardware Security Module (HSM) 156. The HSM is a module for lowering the possibility of leaking an encryption key by performing security operation, such as creation of an encryption key, management of the key, encryption or the like, inside HSM equipment, basically using its own CPU and memory. The HSM has various interfaces of a smart card, USB, PCI, Ethernet and the like. The V2X system specifies hardware and software implementation for the security (IEEE 1609.2). The HSM 156 is a hardware security method, and a security IC is included for this purpose.

Figure 5:
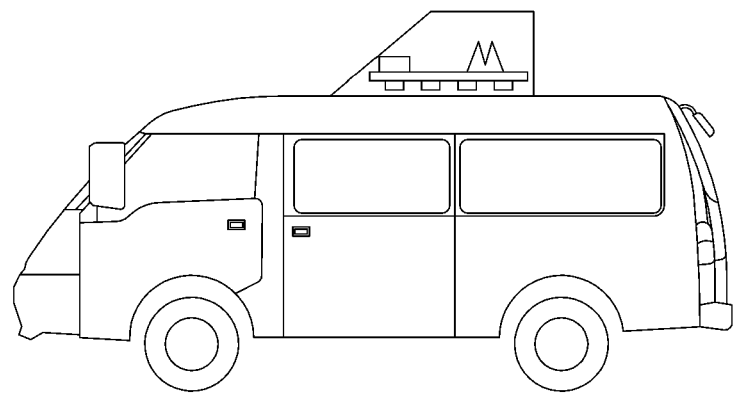
FIG. 5 is a view showing an example of applying an antenna device to a shark antenna of a vehicle according to an embodiment of the present invention.
Figure 6:
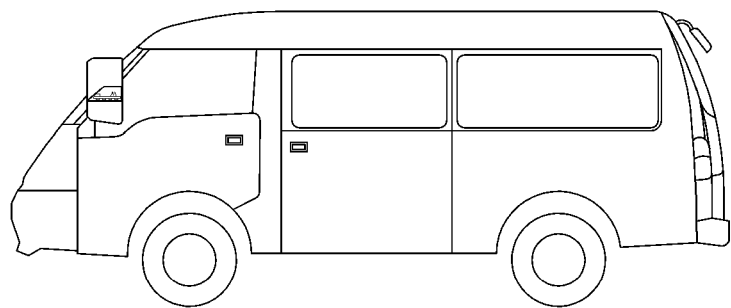
FIG. 6 is a view showing an example of applying an antenna device to a side mirror of a vehicle according to an embodiment of the present invention.

FIG. 5 is a view showing an example of applying an antenna device to a shark antenna of a vehicle according to an embodiment of the present invention, and FIG. 6 is a view showing an example of applying an antenna device to a side mirror of a vehicle according to an embodiment of the present invention. Referring to FIGS. 5 and 6, an antenna device may be designed as an external type or an internal type according to the type of the WAVE antenna 120. The external type may be implemented in a shark antenna type and a side mirror type, and the internal type may be implemented in a vehicle front side type and a rear window mounting type.

When the antenna device is applied to a shark antenna or a side mirror, the system module of the present invention including a plurality of semiconductor components may be electrically and directly connected to at least one of the WAVE antenna, the GPS antenna and the Wi-Fi antenna through the substrate. A conventional system module is connected to an antenna through a cable such as an RF cable or the like, and communication distance is reduced as much as about 30 meters per one meter of cable length. Accordingly, communication distance can be sufficiently secured and communication sensitivity and accuracy can be improved by electrically and directly connecting the system module of the present invention through the substrate.

The embodiments of the present invention have been disclosed for illustrative purposes, and it is to be appreciated that even the parts that can be changed, modified or added by those skilled in the art within the scope and spirit of the present invention fall within the claims of the present invention.

The invention claimed is:

1. An antenna device comprising:
a substrate;
a WAVE antenna disposed on a first surface of the substrate to transmit and receive data to and from an external vehicle or a base station;
a GPS antenna disposed on the first surface of the substrate; and
a system module disposed on a second surface of the substrate to receive a signal from at least any one of the WAVE antenna and the GPS antenna, wherein the system module includes:
a signal processing unit electrically connected to the WAVE antenna to transmit a signal to the WAVE antenna and to receive a signal from the WAVE antenna;
a GPS unit electrically connected to the GPS antenna to transmit and to receive GPS signals;
a control unit for controlling operation of the system module to transmit and receive signals to and from the signal processing unit or the GPS unit and to transmit and receive the signal to an outside of the antenna device; and
a power supply unit electrically connected to a power supply unit of the vehicle to transform a voltage of the power supply unit of the vehicle to a predetermined voltage for the system module and to supply the transformed voltage.

2. The device according to claim 1, wherein the WAVE antenna comprises a plurality of antennas.

3. The device according to claim 2, wherein oriented directions of the plurality of antennas are different from each other.

4. The device according to claim 1, wherein an antenna gain of the WAVE antenna is 3 to 6 dBi.

5. The device according to claim 1, further comprising:
a Wi-Fi antenna disposed on the second surface of the substrate to transmit data, the data received from the WAVE antenna, to a head unit and to transmit data, the data received from the head unit, to the WAVE antenna.

6. The device according to claim 5, wherein the Wi-Fi antenna is disposed in the system module.

7. The device according to claim 1, wherein the system module further includes a memory unit for storing the signals transmitted and received by the signal processing unit or the GPS unit.

8. The device according to claim 1, wherein the system module further includes a Hardware Security Module (HSM) unit.

9. The device according to claim 1, wherein the control unit is configured to transmit and receive a signal to and from the external vehicle using Ethernet or to transmit and receive a signal to and from other microcontrollers in the vehicle using CAN (Controller Area Network) communication.

10. The device according to claim 1, wherein the power supply unit is configured to receive 6V to 19V of battery input power of the vehicle, to transform the input power into 5V, which is a voltage appropriate to the system module, and to supply the transformed voltage.

11. The device according to claim 1, wherein the system module is electrically and directly connected to at least one of the WAVE antenna and the GPS antenna through the substrate.

12. The device according to claim 1, wherein the system module further includes a Wi-Fi unit electrically connected to the Wi-Fi antenna to transmit and receive signals to and from the Wi-Fi antenna.

13. The device according to claim 12, wherein the Wi-Fi unit is configured to authenticate a connected device by pairing a signal transmitted or received by the Wi-Fi antenna with the control unit.

14. The device according to claim 12, wherein the control unit is configured to display the signals transmitted and received by the Wi-Fi antenna on a display unit connected to the system module using a mirror link method.

15. The device according to claim 12, wherein the control unit is configured to transmit the signals transmitted and received by the WAVE antenna or the Wi-Fi antenna to a head-up display (HUD) to be displayed on the HUD.

* * * * *